United States Patent
Liu et al.

(10) Patent No.: US 12,481,021 B2
(45) Date of Patent: Nov. 25, 2025

(54) SIGNAL RECEIVING METHOD AND DEVICE, MEDIUM, AND RADAR SYSTEM

(71) Applicant: SHENZHEN YINWANG INTELLIGENT TECHNOLOGIES CO., LTD., Shenzhen (CN)

(72) Inventors: Yuan Liu, Wuhan (CN); Wei Xiong, Wuhan (CN); Ke Huang, Wuhan (CN); Qi Zhu, Wuhan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 381 days.

(21) Appl. No.: 17/895,954

(22) Filed: Aug. 25, 2022

(65) Prior Publication Data
US 2022/0404463 A1 Dec. 22, 2022

Related U.S. Application Data

(63) Continuation of application No. PCT/CN2020/076854, filed on Feb. 26, 2020.

(51) Int. Cl.
G01S 7/40 (2006.01)
G01S 17/931 (2020.01)

(52) U.S. Cl.
CPC .......... *G01S 7/4013* (2021.05); *G01S 17/931* (2020.01)

(58) Field of Classification Search
CPC .......... G01S 13/931; G01S 13/18; G01S 7/03; G01S 7/354; G01S 7/4013

(Continued)

(56) References Cited

U.S. PATENT DOCUMENTS 3,911,432 A * 10/1975 Williams .............. G01S 7/0235
342/59
4,133,320 A * 1/1979 Bianchi .............. F02D 41/1487
123/436

(Continued)

FOREIGN PATENT DOCUMENTS

AT 513402 B1 9/2014
CN 204256417 U 4/2015

(Continued)

OTHER PUBLICATIONS

Satya at Urban School Simulation Services found at https://www.youtube.com/watch?v=KFRGQb_4EpM and published Feb. 14, 2014. Saved relevant image from video as PDF titled Chopper_Circuits. (Year: 2014).*

(Continued)

*Primary Examiner* — Michael W Justice
(74) *Attorney, Agent, or Firm* — Fish & Richardson P.C.

(57) ABSTRACT

This application discloses a signal receiving method and device, a medium, and a radar system. The radar system includes: a window, a radar transmitter, a radar receiver, a processor, and a signal receiving circuit. The radar transmitter is configured to: transmit a radar detection signal to a front obstacle through the window. The radar receiver is connected to the signal receiving circuit, and receive a reflected signal generated by the obstacle, and transmit the reflected signal to the signal receiving circuit. The signal receiving circuit is connected to the processor, and when the radar transmitter transmits the radar detection signal, receive, after preset duration, the reflected signal where the preset duration is a sum of first duration required for the radar detection signal to arrive at the window and second duration required for the reflected signal to arrive at the radar receiver from the window.

20 Claims, 4 Drawing Sheets

(58) Field of Classification Search
USPC .................................... 342/70, 175, 71, 43
See application file for complete search history.

(56) References Cited

U.S. PATENT DOCUMENTS

| | | | | | |
|---|---|---|---|---|---|
| 4,780,909 | A * | 10/1988 | Sakashita | ............... | H03J 5/0245 |
| | | | | | 455/340 |
| 4,991,165 | A * | 2/1991 | Cronyn | ................. | H04B 1/525 |
| | | | | | 370/278 |
| 5,373,432 | A * | 12/1994 | Vollin | ................. | H02M 3/3376 |
| | | | | | 363/16 |
| 5,636,114 | A * | 6/1997 | Bhagwat | .......... | H03K 17/08142 |
| | | | | | 363/56.12 |
| 6,215,226 | B1 * | 4/2001 | Durkee | ............... | G01F 23/2968 |
| | | | | | 310/319 |
| 6,980,445 | B2 * | 12/2005 | Fukumoto | ........... | H02M 3/1563 |
| | | | | | 323/284 |
| 7,119,735 | B2 * | 10/2006 | Hirose | ................. | G01S 13/931 |
| | | | | | 342/159 |
| 7,952,514 | B2 * | 5/2011 | Nilsson | .................... | G01S 7/282 |
| | | | | | 342/124 |
| 8,115,404 | B2 * | 2/2012 | Goriki | ................. | H05B 41/288 |
| | | | | | 315/246 |
| 9,091,745 | B2 * | 7/2015 | Woodell | .................... | H01Q 3/24 |
| 9,413,472 | B2 * | 8/2016 | Haynes | ................ | H04B 17/102 |
| 9,423,491 | B2 * | 8/2016 | Ishida | ....................... | G01S 7/03 |
| 9,479,104 | B1 * | 10/2016 | Hollenbeck | ............... | H02P 1/44 |
| 9,753,121 | B1 * | 9/2017 | Davis | ..................... | G01S 7/282 |
| 9,829,567 | B1 * | 11/2017 | Davis | ..................... | G01S 7/023 |
| 10,067,225 | B1 | 9/2018 | Sentelle et al. | | |
| 10,067,255 | B2 * | 9/2018 | Colombo | ............... | G01V 1/288 |
| 10,110,218 | B2 * | 10/2018 | Foley | ..................... | H03F 3/245 |
| 10,408,921 | B2 * | 9/2019 | Mcquillen | ............ | G05D 1/0257 |
| 10,451,728 | B2 * | 10/2019 | Farmer | ................. | G01S 13/931 |
| 10,686,487 | B2 * | 6/2020 | Kirkpatrick | ............. | G01S 7/006 |
| 10,775,478 | B2 * | 9/2020 | Davis | ..................... | G01S 13/931 |
| 10,948,332 | B2 * | 3/2021 | Kleman | ................ | G01S 13/343 |
| 10,972,016 | B2 * | 4/2021 | Gazit | ....................... | H02J 3/38 |
| 11,079,471 | B2 * | 8/2021 | Guarin Aristizabal | ...................... | |
| | | | | | G01S 13/87 |
| 11,183,772 | B2 * | 11/2021 | Lee | ........................ | G01S 13/931 |
| 11,437,659 | B2 * | 9/2022 | Sun | ...................... | H01M 10/482 |
| 11,740,323 | B2 * | 8/2023 | Davis | ..................... | G01S 13/70 |
| | | | | | 342/95 |
| 2004/0246172 | A1 * | 12/2004 | Hirose | .................... | G01S 7/038 |
| | | | | | 342/198 |
| 2005/0162143 | A1 * | 7/2005 | Fukumoto | ........... | H02M 3/1563 |
| | | | | | 323/284 |
| 2008/0218324 | A1 * | 9/2008 | Li | .......................... | G01S 15/87 |
| | | | | | 340/932.2 |
| 2010/0039039 | A1 * | 2/2010 | Goriki | .................. | H05B 41/388 |
| | | | | | 315/246 |
| 2010/0123614 | A1 * | 5/2010 | Nilsson | ..................... | G01S 7/02 |
| | | | | | 342/124 |
| 2013/0214972 | A1 * | 8/2013 | Woodell | .................... | H01Q 3/24 |
| | | | | | 342/372 |
| 2013/0222783 | A1 * | 8/2013 | Lancaster | ............. | G01S 7/4876 |
| | | | | | 356/4.01 |
| 2013/0241464 | A1 * | 9/2013 | Kim | ......................... | H02J 7/34 |
| | | | | | 320/101 |
| 2015/0008843 | A1 * | 1/2015 | Haynes | ................ | H04B 17/102 |
| | | | | | 315/291 |
| 2015/0378006 | A1 * | 12/2015 | Ishida | .................. | H01Q 19/021 |
| | | | | | 342/175 |
| 2016/0308479 | A1 * | 10/2016 | Hollenbeck | ............. | H02P 25/04 |
| 2017/0041038 | A1 * | 2/2017 | Kirkpatrick | ............... | H04B 1/48 |
| 2017/0068008 | A1 * | 3/2017 | Colombo | ............... | G01V 1/362 |
| 2017/0090013 | A1 * | 3/2017 | Paradie | ................. | G01S 7/2926 |
| 2017/0219691 | A1 * | 8/2017 | Farmer | .................. | G01S 7/038 |
| 2018/0081029 | A1 * | 3/2018 | Davis | ...................... | G01S 13/70 |
| 2018/0120415 | A1 * | 5/2018 | Mcquillen | ............ | G05D 1/0257 |
| 2018/0136028 | A1 * | 5/2018 | Kleman | .................... | G01S 7/35 |
| 2018/0145680 | A1 * | 5/2018 | Foley | ..................... | H03F 3/195 |
| 2018/0233929 | A1 * | 8/2018 | Schultz | .................. | H02J 7/342 |
| 2019/0033116 | A1 * | 1/2019 | Hoferer | .................. | G01F 25/20 |
| 2019/0180622 | A1 * | 6/2019 | Yang | ..................... | G01S 13/933 |
| 2019/0187245 | A1 * | 6/2019 | Guarin Aristizabal | ...................... | |
| | | | | | G01S 7/038 |
| 2020/0091617 | A1 * | 3/2020 | Lee | ........................ | G01S 13/325 |
| 2020/0136523 | A1 * | 4/2020 | Gazit | ..................... | H02M 7/537 |
| 2020/0324719 | A1 * | 10/2020 | Mahmoud | ............... | H04L 12/10 |
| 2020/0395640 | A1 * | 12/2020 | Sun | ..................... | H01M 10/425 |
| 2021/0003664 | A1 * | 1/2021 | Davis | ................. | G01S 7/0234 |
| 2022/0013885 | A1 * | 1/2022 | Yang | ..................... | H01Q 1/525 |
| 2022/0146622 | A1 * | 5/2022 | Megerdichian | ....... | H01Q 1/1271 |

FOREIGN PATENT DOCUMENTS

| | | |
|---|---|---|
| CN | 105744394 A | 7/2016 |
| CN | 108983249 A | 12/2018 |
| CN | 109297564 A | 2/2019 |

OTHER PUBLICATIONS

Extended European Search Report in European Appln No. 20921391.7, dated Dec. 19, 2022, 9 pages.

PCT International Search Report and Written Opinion issued in International Application No. PCT/CN2020/076854 on Nov. 19, 2020, 17 pages (with English translation).

Office Action in Chinese Appln. No. 202080097480.1, mailed on Sep. 9, 2024, 16 pages (with English translation).

* cited by examiner

SIGNAL RECEIVING METHOD AND DEVICE, MEDIUM, AND RADAR SYSTEM

CROSS-REFERENCE TO RELATED APPLICATIONS

This application is a continuation of International Application No. PCT/CN2020/076854, filed on Feb. 26, 2020, the disclosure of which is hereby incorporated by reference in its entirety.

TECHNICAL FIELD

This application relates to the field of electronic electric technologies, and in particular, to a signal receiving method and device, a medium, and a radar system.

BACKGROUND

Continuous developing of autonomous driving technologies of vehicles requires higher autonomous driving levels. An autonomous driving system needs to effectively detect, identify, and classify various complex road conditions. As one of the most important sensors in the autonomous driving system, a laser radar system is developing towards a higher resolution (>100 lines), a larger field of view (>120°), and a longer detection distance (>200 m).

A conventional radar system includes at least a radar transmitter, a radar receiver, a window, and a processor. The radar transmitter is configured to: transmit a radar detection signal, and transmit the radar detection signal to an obstacle in front of the radar system through a window. The radar receiver is configured to receive a reflected signal generated when the radar detection signal encounters the obstacle. The processor is configured to process the reflected signal received by the radar receiver, to obtain road condition information ahead and generate a road condition diagram. When the radar detection signal passes through the window inside the radar system, a reflected signal is also generated. Therefore, the reflected signal received by the radar receiver not only includes the reflected signal generated when the radar detection signal encounters the obstacle in front, but also includes the reflected signal generated when the radar detection signal encounters the window. When the processor processes the information, the generated road condition diagram includes other information in addition to the road condition information. When the autonomous driving system controls an electric vehicle or a robot to travel based on the information, an unclear road condition may occur. Consequently, a detection result of the existing radar system has low accuracy.

SUMMARY

Embodiments of this application provide a signal receiving method and device, a medium, and a radar system, to improve accuracy of a detection result of the radar system.

According to a first aspect, an embodiment of this application provides a radar system. The radar system includes: a radar transmitter, a radar receiver, a window, a processor, and a signal receiver circuit. The radar receiver is connected to the signal receiving circuit; and the signal receiving circuit is connected to the processor.

The radar transmitter may be configured to: transmit a radar detection signal, and transmit the radar detection signal to a front obstacle through the window. The radar receiver may be configured to: receive a reflected signal generated when the radar detection signal encounters the obstacle, and transmit the reflected signal to the signal receiving circuit. The signal receiving circuit may be configured to: when the radar transmitter transmits the radar detection signal, receive, after preset duration, the reflected signal transmitted by the radar receiver, convert the reflected signal into an electrical signal, and output the electrical signal to the processor. The processor may be configured to process the electrical signal to obtain information about the front obstacle. The preset duration is a sum of first duration required for the radar detection signal to arrive at the window and second duration required for a reflected signal to arrive at the radar receiver from the window.

By using the foregoing system structure, because the radar detection signal generated by the radar transmitter needs to be transmitted through the window, it can be learned that the window is closer to the radar receiver than the front obstacle. Therefore, the radar receiver first receives a reflected signal generated when the radar detection signal passes through the window. Duration in which the detection signal arrives at the window and duration in which the reflected signal arrives at the radar receiver from the window may be determined based on a transmission rate of the radar detection signal, so that duration from the radar transmitter transmitting the radar detection signal, to the signal passing through the window, and to a reflected signal being generated and arriving at the radar receiver is determined. By delaying a time for the signal receiving circuit to receive the reflected signal, the signal receiving circuit is controlled not to receive the reflected signal of the window during the period in which the radar receiver transmits the reflected signal of the window, so that accuracy of a radar detection result obtained after the processor processes the electrical signal is ensured, an impact of the reflected signal of the window on the radar detection result is eliminated, and accuracy of the detection result of the radar system is improved.

In a possible design, the signal receiving circuit includes: a control circuit and a converter. The control circuit is configured to: connect to a power supply, receive electric energy output by the power supply, and when the radar transmitter transmits the radar detection signal, supply electric energy to the converter after the preset duration. The converter is separately connected to the control circuit, the radar receiver, and the processor, and is configured to: when the control circuit supplies the electric energy, receive the reflected signal transmitted by the radar receiver, convert the reflected signal into the electrical signal, and output the electrical signal to the processor.

By using the foregoing system structure, and by delaying (the preset duration) a power supply time of the converter, the converter cannot receive the reflected signal of the window during the period in which the radar receiver transmits the reflected signal of the window, so that the accuracy of the radar detection result obtained by the processor processing the signal output by the converter is ensured, the impact of the reflected signal of the window on the radar detection result is eliminated, and the accuracy of the detection result of the radar system is improved.

In a possible design, the control circuit includes: an inductor, a diode, a first switch, and a first capacitor. A first end of the inductor is configured to connect to a positive electrode of the power supply, and a second end of the inductor is connected to an anode of the diode; a cathode of the diode is separately connected to a first end of the first switch, a first end of the first capacitor, and the converter; and a second end of the first capacitor and a second end of the first switch are separately configured to connect to a negative electrode of the power supply.

By using the foregoing system structure, when the first switch is turned on (turned on), the first capacitor is short-circuited by a conduction path including the inductor, the diode, and the first switch, and a voltage at both ends of the first capacitor is equal to a breakover voltage of the first switch that is approximately equal to 0V. In this case, a supply voltage of the converter connected to the first capacitor is approximately equal to 0V, and the converter does not work. When the first switch is turned off, the power supply charges the first capacitor by using a conduction path including the inductor, the diode, and the first conductor, and both ends of the converter obtain electric energy, so that the electric energy is supplied to the converter, and the converter receives the reflected signal transmitted by the radar receiver.

In a possible design, the control circuit includes: a first resistor, a second resistor, a second switch, and a second capacitor. A first end of the first resistor is configured to connect to a positive electrode of the power supply, and a second end of the first resistor is separately connected to a first end of the second resistor, a first end of the second capacitor, and the converter; a second end of the second resistor is connected to a first end of the second switch; and a second end of the second switch and a second end of the second capacitor are separately configured to connect to a negative electrode of the power supply.

By using the foregoing circuit structure, when the second switch is turned on, the second capacitor is short-circuited by a conduction path including the first resistor, the second resistor, and the second switch. A voltage at both ends of the second capacitor is equal to a voltage at both ends of the second resistor after the first resistor and the second resistor are divided. Resistance value of the second resistor is relatively small. The voltage at the both ends of the second resistor after the division is less than a startup voltage of the converter. The converter does not work. When the second switch is turned off, the power supply charges the second capacitor by using the conduction path including the first resistor and the second resistor, both ends of the converter obtain electric energy, so that the electric energy is supplied to the converter, and the converter receives the reflected signal transmitted by the radar receiver.

In a possible design, the control circuit includes: a third switch, a fourth switch, and a third capacitor. A first end of the third switch is configured to connect to a positive electrode of the power supply, a second end of the third switch is separately connected to a first end of the fourth switch, a first end of the third capacitor, and the converter, and a second end of the fourth switch and a second end of the third capacitor are separately configured to connect to a negative electrode of the power supply.

By using the foregoing circuit structure, when the third switch and the fourth switch are simultaneously turned on, the third capacitor is short-circuited by a conduction path including the third switch and the fourth switch, and a voltage at both ends of the third capacitor is equal to a breakover voltage of the fourth switch that is approximately equal to 0V. In this case, a supply voltage of the converter connected to the third capacitor is approximately equal to 0V, and the converter does not work. When the fourth switch is turned off and the third switch is turned on, the power supply charges the third capacitor by using a conduction path including the third switch and the third capacitor, and both ends of the converter obtain electric energy, so that the electric energy is supplied to the converter, and the converter receives the reflected signal transmitted by the radar receiver.

In a possible design, the power supply includes a plurality of sub-power supplies with different voltages. The control circuit includes: a fourth capacitor and a plurality of switches that are in a one-to-one correspondence with the different sub-power supplies; a first end of each of the plurality of switches is configured to connect to a positive electrode of the corresponding sub-power supply, and a second end of each of the plurality of switches is separately connected to a first end of the fourth capacitor and the converter; and a second end of the fourth capacitor is configured to connect to a negative electrode of each of the plurality of sub-power supplies.

By using the foregoing circuit structure, when any one of the plurality of switches is turned on, a power supply sub-power supply connected to the switch charges the fourth capacitor by using a conduction path including the turned-on switch and the fourth capacitor, to supply power to the converter and control the converter to work. Because voltages output by the sub-power supplies that are connected to the switches are different, when the fourth capacitor is connected to different switches, charging rates of the fourth capacitor are different, and electric energy obtained by the converter is different, that is, working efficiency of the converter may be controlled by controlling different switches to be turned on or off.

In a possible design, the signal receiving circuit further includes a signal amplifier. The signal amplifier is configured to connect to the converter and the processor, and the signal amplifier is configured to amplify power of a signal output by the converter and output the signal to the processor.

By using the foregoing circuit structure, power amplification may be performed on the signal output by the converter, so that the processor processes the signal.

According to a second aspect, an embodiment of this application provides an autonomous driving system. The autonomous driving system includes the radar system provided in the first aspect and any possible design in the first aspect.

For technical effects brought by any possible design in the second aspect, refer to technical effects brought by the first aspect and/or different designs in the first aspect. Details are not described herein again.

According to a third aspect, an embodiment of this application provides a signal receiving method, applied to the radar system provided in the first aspect and any possible design in the first aspect. The method includes: receiving electric energy output by a power supply; and when it is determined that the radar transmitter transmits a radar detection signal, supplying electric energy to the signal receiving circuit after preset duration, so that the signal receiving circuit receives a reflected signal transmitted by the radar receiver, where the preset duration is a sum of first duration required for the radar detection signal to arrive at the window and second duration required for a reflected signal to arrive at the radar receiver from the window.

By using the foregoing method, within the preset duration (that is, within a time period in which the radar receiver transmits the reflected signal of the window) after the radar transmitter transmits the radar detection signal, the signal receiving circuit cannot receive the reflected signal of the window transmitted by the radar receiver, so that accuracy of receiving a signal by the signal receiving circuit is ensured, and accuracy of a detection result of the radar system is improved.

In a possible design, the preset duration is determined in the following steps: determining a first distance between the radar transmitter and the window and a second distance between the radar receiver and the window; and determining the preset duration based on a transmission rate of the radar detection signal, the first distance, and the second distance.

By using the foregoing method, because the reflected signal is generated when the radar detection signal encounters an obstacle, it may be determined that a type of the reflected signal is the same as that of the radar detection signal (for example, an optical signal), that is, a transmission rate of the reflected signal is the same as that of the radar detection signal. Based on the transmission rate of the radar detection signal, the first distance and the second distance, duration (preset duration) from the radar detection signal being transmitted, the radar detection signal passing through the window to generate the reflected signal, to the reflected signal arriving at the radar receiver may be determined. In addition, the time for the signal receiving circuit to receive a reflected signal transmitted by the radar receiver is accurately controlled based on the duration, to ensure that the signal receiving circuit cannot receive the reflected signal of the window, so that accuracy of the received signal is ensured, and accuracy of the detection result of the radar system is improved.

According to a fourth aspect, an embodiment of this application provides a signal receiving device, and the signal receiving device includes: a memory and a processor. The memory is configured to store program instructions. The processor is configured to invoke the program instructions stored in the memory, to perform the signal receiving method provided in the third aspect and any possible design in the third aspect.

For technical effects brought by any possible design in the fourth aspect, refer to technical effects brought by the third aspect and/or different designs in the third aspect. Details are not described herein again.

According to a fifth aspect, an embodiment of this application provides a computer-readable storage medium. The computer-readable storage medium stores computer instructions. When the computer instructions are run on a computer, the computer is enabled to perform the signal receiving method provided in the third aspect and any possible design of the third aspect.

In addition, for technical effects brought by any possible design in the fifth aspect, refer to technical effects brought by the third aspect and/or different designs in the third aspect. Details are not described herein again.

DESCRIPTION OF EMBODIMENTS

The following describes in detail embodiments of this application with reference to accompanying drawings.

A radar system provided in embodiments of this application may be disposed on an electric vehicle or a mobile robot, and is configured to detect a road condition in front of the electric vehicle or the mobile robot, to plan a moving route of the electric vehicle or the mobile robot.

Figure 1:
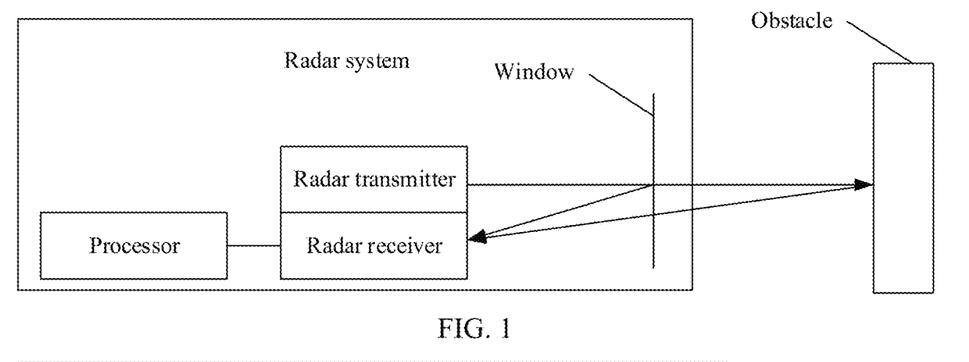
FIG. 1 is a schematic diagram of a structure of an existing radar system according to an embodiment of this application.

FIG. 1 shows a possible structure of a radar system. As shown in FIG. 1, the radar system includes a radar transmitter, a radar receiver, a window, and a processor. The radar transmitter is configured to: generate a radar detection signal, and transmit the radar detection signal to a front obstacle through the window. The radar receiver is configured to receive a reflected signal generated when the radar detection signal encounters the obstacle. The processor is configured to process the reflected signal to obtain a road condition in front of an electric vehicle or a mobile robot.

Although the radar system shown in FIG. 1 can detect the road condition in front of the electric vehicle or the mobile robot, the reflected signal transmitted by the radar receiver and processed by the processor not only includes the reflected signal generated when the radar detection signal encounters the obstacle in front of the electric vehicle, but also includes a reflected signal generated when the radar detection signal encounters the window. When the processor processes these signals, there may be an error between the obtained road condition (for example, a road condition diagram) and an actual road condition. Consequently, when the electric vehicle or the mobile robot moves based on the road condition diagram, a moving location may deviate, and normal operation of the electric vehicle or the mobile robot is affected.

Therefore, a detection result of the radar system in the conventional technology is inaccurate.

To make objectives, technical solutions, and advantages of this application clearer, the following further describes this application in detail with reference to the accompanying drawings.

Embodiments of this application provide a signal receiving method and device, a medium, and a radar system, to improve accuracy of a detection result of the radar system.

It should be noted that "a plurality of" used in this application means two or more.

The term "connection" used in this application describes a connection relationship between two objects, and may represent two types of connection relationships. For example, that A is connected to B may represent the following two cases: A is directly connected to B, and A is connected to B by using C.

In addition, it should be understood that, in descriptions of this application, terms such as "first" and "second" are merely for purpose of differentiation and description, but should not be understood as indication or implication of relative importance or indication or implication of an order.

Figure 2:
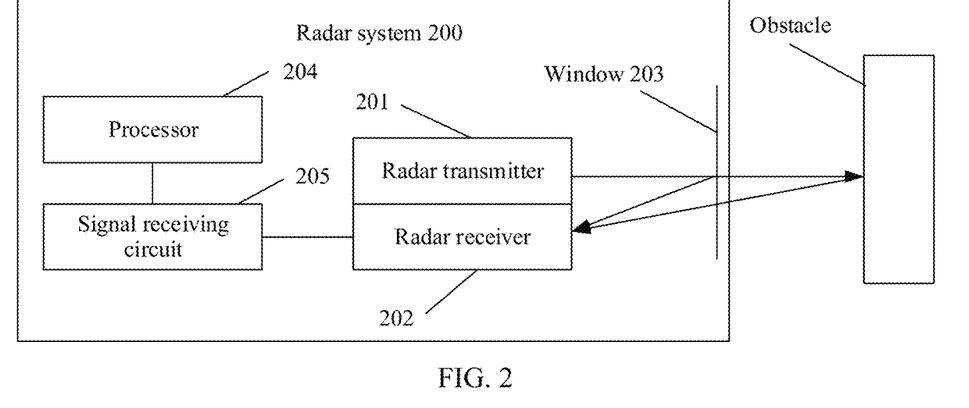
FIG. 2 is a schematic diagram 1 of a structure of a radar system according to an embodiment of this application.

FIG. 2 is a schematic diagram of a structure of a radar system according to an embodiment of this application. The radar system 200 includes a radar transmitter 201, a radar receiver 202, a window 203, a processor 204, and a signal receiving circuit 205. The radar receiver 202 is connected to the signal receiving circuit 205, and the signal receiving circuit 205 is connected to the processor 204.

The radar transmitter 201 may be configured to: transmit a radar detection signal, and transmit the radar detection signal to a front obstacle through the window. The radar receiver 202 may be configured to: receive a reflected signal generated when the radar detection signal encounters the obstacle, and transmit the reflected signal to the signal receiving circuit 205. The signal receiving circuit 205 may be configured to: when the radar transmitter 201 transmits the radar detection signal, receive, after preset duration, the reflected signal transmitted by the radar receiver 202, convert the reflected signal into an electrical signal, and output the electrical signal to the processor 204. The processor 204 may be configured to process the electrical signal to obtain information about the front obstacle. The preset duration is a sum of first duration required for the radar detection signal to arrive at the window 203 and second duration required for the reflected signal to arrive at the radar receiver 202 from the window 203.

When the radar system 200 is used to detect the front obstacle, the radar detection signal generated by the radar transmitter 201 needs to be transmitted through the window 203, and it may be learned that the window 203 is closer to the radar receiver 202 than the front obstacle. Therefore, the radar receiver 202 first receives a reflected signal generated when the radar detection signal passes through the window 203. Duration required for the radar detection signal to arrive at the window 203 and duration required for the reflected signal to arrive at the radar receiver 202 from the window 203 may be determined based on a transmission rate of the radar detection signal, to determine duration (preset duration) from a moment at which the reflected signal is generated when the signal passes through the window 203 to a moment at which the reflected signal arrives at the radar receiver. By delaying (preset duration) a moment at which the signal receiving circuit 205 receives the reflected signal transmitted by the radar receiver 202, the signal receiving circuit 205 is controlled not to receive the signal when the radar receiver 202 transmits the reflected signal through the window 203. Accuracy of the front obstacle obtained after the processor receives and processes the signal output by the signal receiving circuit 205 is high, impact of the reflected signal of the window 203 on a detection result of the radar system 200 is eliminated.

Specifically, the signal receiving circuit 205 includes a control circuit 2051 and a converter 2052. The control circuit 2051 is configured to connect to a power supply, and the converter 2052 is separately connected to the control circuit 2051, the radar receiver 202, and the processor 204.

The control circuit 2051 is configured to: receive electric energy output by the power supply, and when the radar transmitter 201 transmits the radar detection signal, supply electric energy to the converter 2052 after the preset duration. The converter 2052 is configured to: when the control circuit 2051 supplies the electric energy, receive the reflected signal transmitted by the radar receiver 202, convert the reflected signal into the electrical signal, and output the electrical signal to the processor 204.

It should be understood that, to avoid excessively low power of a signal output by the converter 2052, a signal amplifier may be further disposed between the converter 2052 and the processor 204, and is configured to: amplify power of the signal output by the converter 2052, and output the signal to the processor 204, so that the processor 204 can process the signal output by the converter 2052.

The following describes specific structures of the control circuit 2051 and the converter 2052 in the signal receiving circuit 205.

1. Control Circuit 2051

Figure 3:
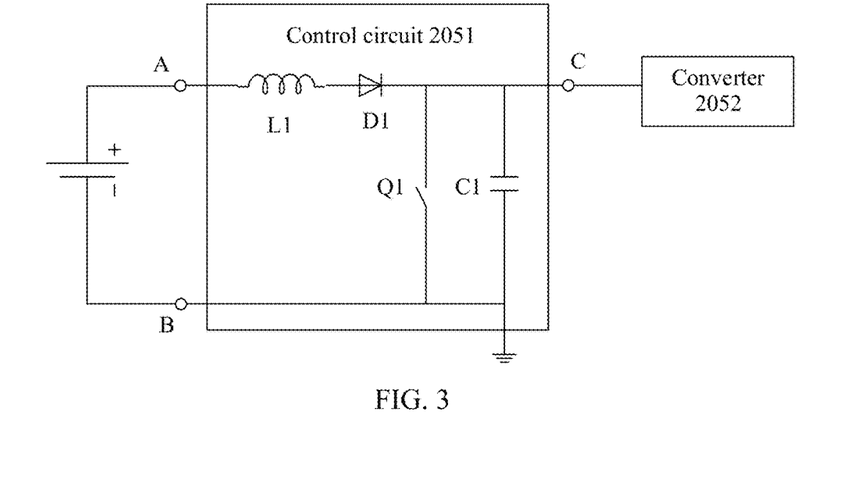
FIG. 3 is a schematic diagram 1 of a structure of a control circuit according to an embodiment of this application.

The control circuit 2051 provided in embodiments of this application may have four specific circuit structures based on different components and different connection manners of the components. The following describes the circuit structures of the control circuit 2051 provided in this application with reference to embodiments. Details are as follows:

Embodiment 1: The control circuit 2051 includes: an inductor, a diode, a first switch, and a first capacitor.

Specifically, a first end of the inductor is configured to connect to a positive electrode of the power supply, and a second end of the inductor is connected to an anode of the diode. A cathode of the diode is separately connected to a first end of the first switch, a first end of the first capacitor, and the converter 2052. A second end of the first capacitor and a second end of the first switch are separately configured to connect to a negative electrode of the power supply.

For ease of understanding, the following provides a specific example of the control circuit 2051 provided in Embodiment 1.

FIG. 3 is a schematic diagram of a structure of the control circuit 2051 according to Embodiment 1 of this application. The circuit shown in FIG. 3 includes: a first switch (Q1), an inductor L1, a diode D1, and a first capacitor C1. A and B are used as input ends of the control circuit 2051 and respectively connected to a first endpoint and a second endpoint of an output end of the power supply, and C is used as an output end of the control circuit 2051 and connected to the converter 2052.

When a reflected signal transmitted by the radar receiver 202 is received by using the control circuit 2051 shown in FIG. 3, A and B are used as single-phase input ends to receive electric energy output by the power supply, and C is used as a direct current output end to output the electric energy to the converter 2052. The energy is transmitted from left to right.

Specifically, the ends A and B receive the electric energy output by the power supply. When the first switch Q1 is turned on, a branch circuit in which the first capacitor C1 is located is short-circuited by a conduction path including the inductor L1, the diode D1, and the first switch Q1, and the power supply charges L1. In this case, a voltage at both ends of C1 is equal to a breakover voltage of Q1 that is approximately equal to 0 V. After preset duration, Q1 is controlled to be turned off. In this case, L1, D1, and C1 constitute a conduction path. Electric energy output by the power supply and electric energy stored in L1 are accumulated to charge C1. The voltage at the both ends of C1 gradually increases, and a first endpoint of C1 is connected to the converter 2052, that is, C1 is equivalent to a power supply of the converter 2052. When the voltage at the both ends of C1 is greater than 0 V, C1 supplies electric energy to the converter 2052, and the converter 2052 starts to work. Before Q1 is turned off, a voltage at both ends of the converter 2052 is approximately equal to 0, and the converter 2052 is powered off and cannot receive the reflected signal transmitted by the radar receiver 202.

Specifically, the first switch may be a switch transistor. If the switch transistor in the control circuit 2051 is a metal oxide semiconductor (metal oxide semiconductor, MOS) transistor, a gate of the MOS transistor may be connected to a first controller, and the first controller controls turn-on and turn-off of the MOS transistor, so that the control circuit 2051 controls whether to supply electric energy to the converter 2052. If the switch in the control circuit 2051 is a bipolar junction transistor (bipolar junction transistor, BJT), a base electrode of the BJT may be connected to a first controller, and the first controller controls turn-on and turn-off of the BJT, so that the control circuit 2051 controls whether to supply electric energy to the converter 2052.

During specific implementation, the first controller may be any one of a micro controller unit (micro controller unit, MCU), a central processing unit (central processing unit, CPU), or a digital signal processor (digital signal processor, DSP). Certainly, a specific form of the first controller is not limited to the foregoing example. The first controller may be disposed in the radar system 200 (for example, the processor in the radar system), or may be an external device communicatively connected to the radar system 200. This is not specifically limited in this application.

Figure 4:
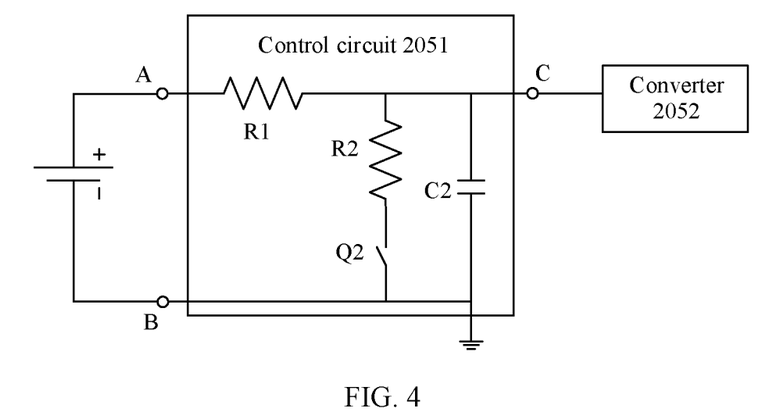
FIG. 4 is a schematic diagram 2 of a structure of a control circuit according to an embodiment of this application.

Embodiment 2: The control circuit 2051 includes: a first resistor, a second resistor, a second switch, and a second capacitor.

Specifically, a first end of the first resistor is configured to connect to a positive electrode of the power supply, and a second end of the first resistor is separately connected to a first end of the second resistor, a first end of the second capacitor, and the converter 2052. A second end of the second resistor is connected to a first end of the second switch. A second end of the second switch and a second end of the second capacitor are separately configured to connect to a negative electrode of the power supply.

For ease of understanding, the following provides a specific example of the control circuit 2051 provided in Embodiment 2.

FIG. 4 is a schematic diagram of a structure of the control circuit 2051 according to Embodiment 2 of this application. The circuit shown in FIG. 4 includes: resistors R1 and R2, a second switch (Q2), and a second capacitor C2. A and B are used as input ends of the control circuit 2051 and respectively connected to a first endpoint and a second endpoint of an output end of the power supply, and C and D are used as output ends of the control circuit 2051 and connected to the converter 2052.

When a reflected signal transmitted by the radar receiver 202 is received by using the control circuit 2051 shown in FIG. 4, A and B are used as single-phase input ends to receive electric energy output by the power supply, and C is used as a direct current output end to output the electric energy to the converter 2052. The energy is transmitted from left to right.

Specifically, the ends A and B receive the electric energy output by the power supply. When the second switch Q2 is turned on, a branch circuit in which the second capacitor C2 is located is short-circuited by a conduction path including the resistors R1 and R2 and the second switch Q2. In this case, a voltage at both ends of C2 is equal to a voltage at both ends of R2 obtained after voltage division is performed on R1 and R2. A resistance of R2 is relatively small. Therefore, the voltage at the both ends of C2 is insufficient to start the converter 2052. After preset duration, Q2 is controlled to be turned off. In this case, R1, R2, and C2 constitute a conduction path. The electric energy output by the power supply is used to charge C2. The voltage at the both ends of C2 gradually increases (a voltage obtained after C2 is completely charged is approximately equal to a voltage of the power supply). A first endpoint of C2 is connected to the converter 2052, that is, C2 is equivalent to a power supply of the converter 2052. When the voltage at the both ends of C2 is greater than or equal to a startup voltage of the converter 2052, the converter 2052 starts to work. Before Q2 is turned off, a voltage at both ends of the converter 2052 is less than the startup voltage, and the converter 2052 is powered off and cannot receive the reflected signal transmitted by the radar receiver 202.

It should be understood that, to prevent electric energy stored in C2 from reversely flowing to the power supply to damage the power supply, a diode may be connected between the first resistor and the power supply.

Specifically, the second switch may be a switch transistor. If the switch transistor in the control circuit 2051 is a MOS transistor, a gate of the MOS transistor may be connected to a second controller, and the second controller controls turn-on and turn-off of the MOS transistor, so that the control circuit 2051 controls whether to supply electric energy to the converter 2052. If the switch in the control circuit 2051 is a BJT, a base electrode of the BJT may be connected to a second controller, and the second controller controls turn-on and turn-off of the BJT, so that the control circuit 2051 controls whether to supply electric energy to the converter 2052.

During specific implementation, the second controller may be any one of an MCU, a CPU, or a DSP. Certainly, a specific form of the second controller is not limited to the foregoing example. The second controller may be disposed in the radar system 200 (for example, the processor in the radar system), or may be an external device communicatively connected to the radar system 200. This is not specifically limited in this application.

Figure 5:
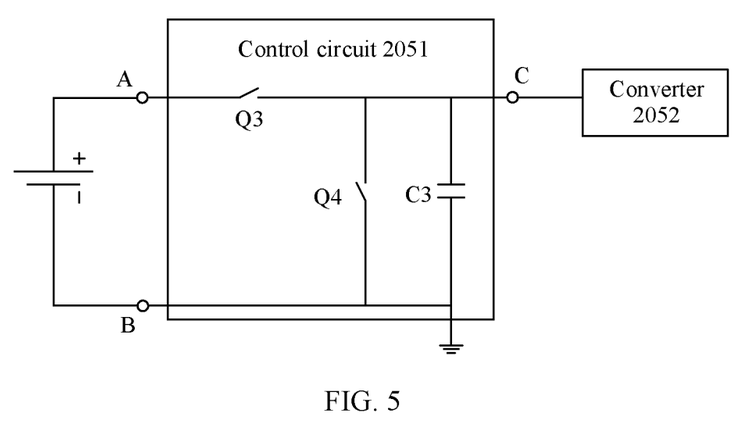
FIG. 5 is a schematic diagram 3 of a structure of a control circuit according to an embodiment of this application.

Embodiment 3: The control circuit 2051 includes: a third switch, a fourth switch, and a third capacitor.

Specifically, a first end of the third switch is configured to connect to a positive electrode of the power supply, and a second end of the third switch is separately connected to a first end of the fourth switch, a first end of the third capacitor, and the converter 2052. A second end of the fourth switch and a second end of the third capacitor are separately configured to connect to a negative electrode of the power supply.

For ease of understanding, the following provides a specific example of the control circuit 2051 provided in Embodiment 3.

FIG. 5 is a schematic diagram of a structure of the control circuit 2051 according to Embodiment 3 of this application. The circuit shown in FIG. 5 includes: a third switch (Q3), a fourth switch (Q4), and a third capacitor C3. A and B are used as input ends of the control circuit 2051 and respectively connected to a first endpoint and a second endpoint of an output end of the power supply, and C is used as an output end of the control circuit 2051 and connected to the converter 2052.

When a reflected signal transmitted by the radar receiver 202 is received by using the control circuit 2051 shown in FIG. 5, A and B are used as single-phase input ends to receive electric energy output by the power supply, and C is used as a direct current output end to output the electric energy to the converter 2052. The energy is transmitted from left to right.

Specifically, the ends A and B receive the electric energy output by the power supply. When both the third switch Q3 and the fourth switch Q4 are turned on, a branch circuit in which the third capacitor C3 is located is short-circuited by a conduction path including the third switch Q3 and the fourth switch Q4. In this case, a voltage at both ends of C3 is equal to a breakover voltage of Q4 that is approximately equal to 0 V. After preset duration, Q4 is controlled to be turned off. In this case, Q3 and C3 constitute a conduction path. The electric energy output by the power supply is used to charge C3. The voltage at the both ends of C3 gradually increases (a voltage obtained after C3 is completely charged is approximately equal to a voltage of the power supply). A first endpoint of C3 is connected to the converter 2052, that is, C3 is equivalent to a power supply of the converter 2052. When the voltage at the both ends of C3 is greater than 0 V, C3 supplies electric energy to the converter 2052, and the converter 2052 starts to work. Before Q4 is turned off, a voltage at both ends of the converter 2052 is approximately equal to 0 V, and the converter 2052 is powered off and cannot receive the reflected signal transmitted by the radar receiver 202.

It should be understood that, to prevent electric energy stored in C3 from reversely flowing to the power supply to damage the power supply, a diode may be connected between the third switch and the power supply.

It should be understood that, to avoid a case in which the power supply is burnt due to excessively large electric energy output by the power supply when both the third switch and the fourth switch are turned on, a resistor may be connected between the third switch and the fourth switch.

Specifically, the third switch and the fourth switch may be switch transistors. If the switch transistor in the control circuit 2051 is a MOS transistor, a gate of the MOS transistor may be connected to a third controller, and the third controller controls turn-on and turn-off of the MOS transistor, so that the control circuit 2051 controls whether to supply electric energy to the converter 2052. If the switch in the control circuit 2051 is a BJT, a base electrode of the BJT may be connected to a third controller, and the third controller controls turn-on and turn-off of the BJT, so that the control circuit 2051 controls whether to supply electric energy to the converter 2052.

During specific implementation, the third controller may be any one of an MCU, a CPU, or a DSP. Certainly, a specific form of the third controller is not limited to the foregoing example. The third controller may be disposed in the radar system 200 (for example, the processor in the radar system), or may be an external device communicatively connected to the radar system 200. This is not specifically limited in this application.

Figure 6:
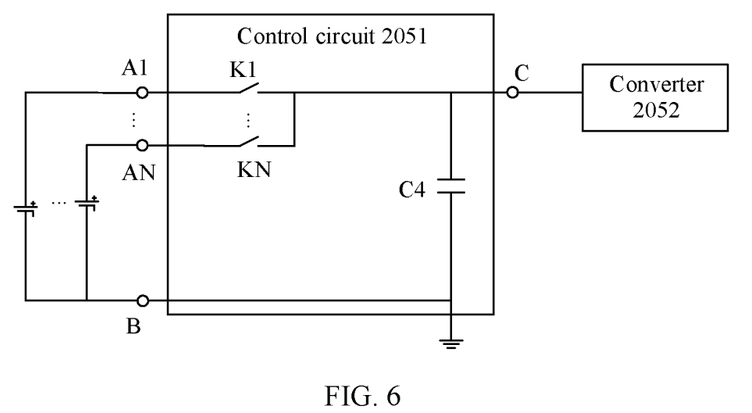
FIG. 6 is a schematic diagram 4 of a structure of a control circuit according to an embodiment of this application.

Embodiment 4: The power supply includes a plurality of sub-power supplies with different voltages, and the control circuit 2051 includes: a fourth capacitor and a plurality of switches that are in a one-to-one correspondence with the different sub-power supplies.

Specifically, a first end of each of the plurality of switches is configured to connect to a positive electrode of the corresponding sub-power supply, and a second end of each of the plurality of switches is separately connected to a first end of the fourth capacitor and the converter. A second end of the fourth capacitor is configured to connect to a negative electrode of each of the plurality of sub-power supplies.

For ease of understanding, the following provides a specific example of the control circuit 2051 provided in Embodiment 4.

FIG. 6 is a schematic diagram of a structure of the control circuit 2051 according to Embodiment 4 of this application. The circuit shown in FIG. 6 includes a plurality of switches (K1 to KN) that are in a one-to-one correspondence with different sub-power supplies and a fourth capacitor C4. A1 to AN and B are used as input ends of the control circuit 2051, A1 to AN are separately connected to first endpoints of output ends of the plurality of sub-power supplies, B is connected to second endpoints of the output ends of the plurality of sub-power supplies, and C is used as an output end of the control circuit 2051 and connected to the converter 2052.

When a reflected signal transmitted by the radar receiver 202 is received by using the control circuit 2051 shown in FIG. 6, A1 to AN and B are used as single-phase input ends to separately receive electric energy output by the corresponding sub-power supplies, and C is used as a direct current output end to output the electric energy to the converter 2052. The energy is transmitted from left to right.

Specifically, the ends A1 to AN and B receive the electric energy output by the power supply. Switches (K1 to KN) in the control circuit 2051 are interlocked, that is, only one switch is turned on at one moment. After preset duration after the radar transmitter 201 transmits a radar detection signal, any switch (for example, K1) in the plurality of switches is controlled to be turned on, and a sub-power supply connected to K1 charges C4 by using a conduction path including the switch K1 and C4. A voltage at both ends of C4 gradually increases (a voltage obtained after C4 is completely charged is approximately equal to a voltage output by the sub-power supply connected to K1). A first endpoint of C4 is connected to the converter 2052, that is, C4 is equivalent to a power supply of the converter 2052. When the voltage at the both ends of C4 is greater than 0 V, C4 supplies electric energy to the converter 2052, and the converter 2052 starts to work. Before the K1 is turned off and the other switches (K2 to KN) are not turned on, a voltage at both ends of the converter 2052 is equal to 0 V, and the converter 2052 is powered off and cannot receive the reflected signal transmitted by the radar receiver 202. Because voltages output by the plurality of sub-power supplies are different, when being connected to different switches, C4 provides different voltages for the converter 2052, and efficiency of receiving, by the converter 2052, the reflected signal transmitted by the radar receiver 202 is also different, that is, efficiency of receiving, by the converter 2052, the reflected signal transmitted by the radar receiver 202 may be controlled by controlling turn-on and turn-off receiving of the plurality of switches.

It should be understood that, to prevent electric energy stored in C4 from reversely flowing to the power supply to damage the power supply, a diode may be connected between each of the plurality of switches and each of the sub-power supplies connected to the plurality of switches.

Specifically, each of the plurality of switches may be a switch transistor. If the switch transistor in the control circuit 2051 is a MOS transistor, a gate of the MOS transistor may be connected to a fourth controller, and the fourth controller controls turn-on and turn-off of the MOS transistor, so that the control circuit 2051 controls whether to supply electric energy to the converter 2052. If the switch in the control circuit 2051 is a BJT, a base electrode of the BJT may be connected to a fourth controller, and the fourth controller controls turn-on and turn-off of the BJT, so that the control circuit 2051 controls whether to supply electric energy to the converter 2052.

During specific implementation, the fourth controller may be any one of an MCU, a CPU, or a DSP. Certainly, a specific form of the fourth controller is not limited to the foregoing example. The fourth controller may be disposed in the radar system 200 (for example, the processor in the radar system), or may be an external device communicatively connected to the radar system 200. This is not specifically limited in this application.

2. Converter 2052

The radar detection signal used to detect the front obstacle in the radar system 200 is usually an optical signal or a sound wave signal. Therefore, if the radar detection signal is an optical signal, the converter 2052 may be a photodiode; or if the radar detection signal is a sound wave signal, the converter 2052 may be a magnetic coil (for example, a horn). The converter 2052 is coupled to the radar receiver 202.

Figure 7:
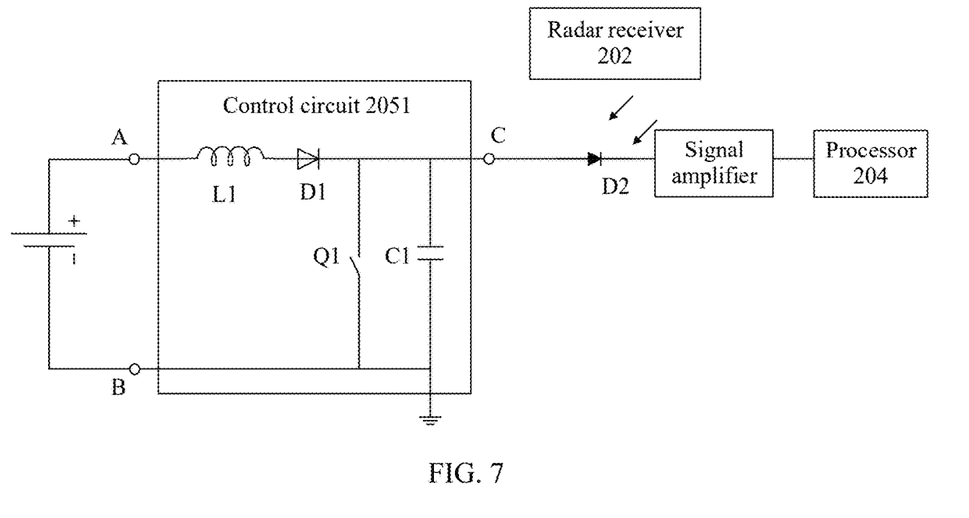
FIG. 7 is a schematic diagram of a structure of a signal receiving circuit control circuit according to an embodiment of this application.

With reference to the foregoing descriptions, for example, a structure of the signal receiving circuit provided in embodiments of this application may be shown in FIG. 7.

The control circuit includes: an inductor L1, a diode D1, a first switch Q1, and a capacitor C1. A first end of L1 is connected to an input end A of the signal receiving circuit, a second end of L1 is connected to an anode of D1, a cathode of D2 is separately connected to a first end of Q1 and a first end of C1, and a second end of Q1 is separately connected to a second end of C1 and an input end B of the signal receiving circuit.

The converter includes a photodiode D2. An anode of D2 is connected to a first end of C1, and a cathode of D2 is connected to a signal amplifier. D2 is connected to fixed-interval receiving radars, and is configured to receive a reflected signal transmitted by the radar receiver.

Specifically, when or before the radar transmitter transmits the radar detection signal, Q1 is turned on. In this case, a voltage at both ends of C1 is a breakover voltage of Q1 that is approximately equal to 0 V. In this case, a potential of the anode of D2 is approximately equal to 0 V, D2 is turned off, and D2 cannot receive the reflected signal transmitted by the radar receiver. After determining preset duration, a control signal is transmitted to a control end of Q1, to control Q1 to be turned off. In this case, electric energy output by the power supply is used to charge C1 by using a path including L1, D1, and C1, that is, the potential of the anode of D2 increases. D2 is turned on, to receive the reflected signal transmitted by the radar receiver, convert the reflected signal into an electrical signal, and output the electrical signal to the signal amplifier for power amplification and output the electrical signal to a processor. The preset duration is a sum of first duration required for the radar detection signal to arrive at the window and second duration required for the reflected signal to arrive at the radar receiver from the window. This ensures that the converter cannot receive the reflected signal through the window during working.

It should be noted that, based on the different structures of the control circuit provided in embodiments, the signal receiving circuit provided in embodiments of this application further has several other structures, and principles of the other circuit structures are the same. Details are not described in this application.

Figure 8:
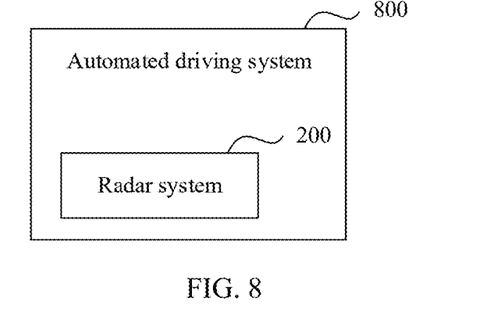
FIG. 8 is a schematic diagram of a structure of an autonomous driving system according to an embodiment of this application.

Based on a same inventive concept, an embodiment of this application further provides an autonomous driving system. As shown in FIG. 8, the autonomous driving system 800 includes the foregoing radar system 200.

Optionally, the autonomous driving system 800 further includes a power supply, and the power supply is configured to supply electric energy to the radar system 200.

In a possible design, the autonomous driving system 800 is connected to an electric vehicle, and is configured to: detect a road condition in front of the electric vehicle, and determine a driving route of the electric vehicle based on the road condition in front of the electric vehicle.

In a possible design, the autonomous driving system 800 is connected to a mobile robot, and is configured to detect a road condition in front of the mobile robot, to control the mobile robot to move.

Based on a same inventive concept, an embodiment of this application further provides a signal receiving method. The signal receiving method is applied to the radar system 200 provided in embodiments of this application.

Figure 9:
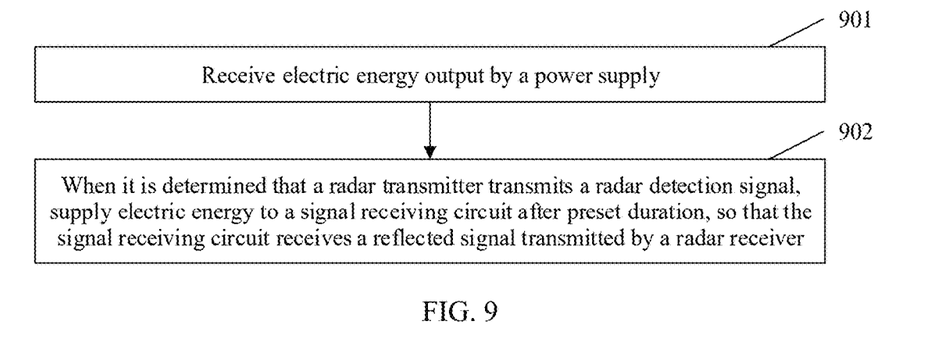
FIG. 9 is a schematic flowchart of a signal receiving method according to an embodiment of this application.

The signal receiving method provided in this embodiment of this application may be shown in FIG. 9. The signal receiving method provided in this embodiment of this application may be performed by a controller in the radar system 200 (for example, the processor in the radar system 200), or may be performed by a processor in another communications device connected to the radar system 200. The method mainly includes the following steps.

S901: Receive electric energy output by a power supply. The power supply may be a direct current power supply, and a voltage output by the power supply may be set based on a working voltage of the signal receiving circuit 205. Details are not described in this application.

Optionally, the power supply may be an alternating current, and a rectifier may be connected between the power supply and the signal receiving circuit 205, and is configured to: convert an alternating current output by the power supply into a direct current, and supply the direct current to the signal receiving circuit 205, to ensure that the signal receiving circuit 205 works normally.

S902: When it is determined that the radar transmitter transmits a radar detection signal, supply electric energy to the signal receiving circuit after preset duration, so that the signal receiving circuit receives a reflected signal transmitted by the radar receiver. The preset duration is a sum of first duration required for the radar detection signal to arrive at the window and second duration required for the reflected signal to arrive at the radar receiver from the window.

The preset duration may be determined by performing the following steps: determining a first distance between the radar transmitter and the window and a second distance between the radar receiver and the window; and determining the preset duration based on a transmission rate of the radar detection signal, the first distance, and the second distance.

Specifically, an example in which the signal receiving method provided in this embodiment of this application is performed by the processor is used. The processor is connected to a control end of a switch in the signal receiving circuit, and turn-on or turn-off of the switch is controlled, to control a moment at which the signal receiving circuit 205 receives the reflected signal transmitted by the radar receiver 202.

With reference to the block diagram of the structure of the signal receiving circuit shown in FIG. 7, the following describes a working principle of the signal receiving method provided in this application.

Specifically, when or before the radar transmitter transmits the radar detection signal, a drive signal is transmitted to Q1, to control Q1 to be turned on. In this case, a voltage at both ends of C1 is a breakover voltage of Q1 that is approximately equal to 0 V. In this case, a potential of the anode of D2 is approximately equal to 0 V, D2 is turned off, and D2 cannot receive the reflected signal transmitted by the radar receiver. After the preset duration is determined, transmission of the drive signal to Q1 is stopped, to control Q1 to be turned off. In this case, the electric energy output by the power supply is used to charge C1 by using a path including L1, D1, and C1, that is, the potential of the anode of D2 increases. D2 is turned on, to receive the reflected signal transmitted by the radar receiver, convert the reflected signal into the electrical signal, and output the electrical signal to the signal amplifier for power amplification and output the electrical signal to a processor. The preset duration is the sum of the first duration required for the radar detection signal to arrive at the window and the second duration required for the reflected signal to arrive at the radar receiver from the window. This ensures that the converter cannot receive the reflected signal through the window, and ensures accuracy of a result obtained by performing processing by the processor based on the received signal.

Figure 10:
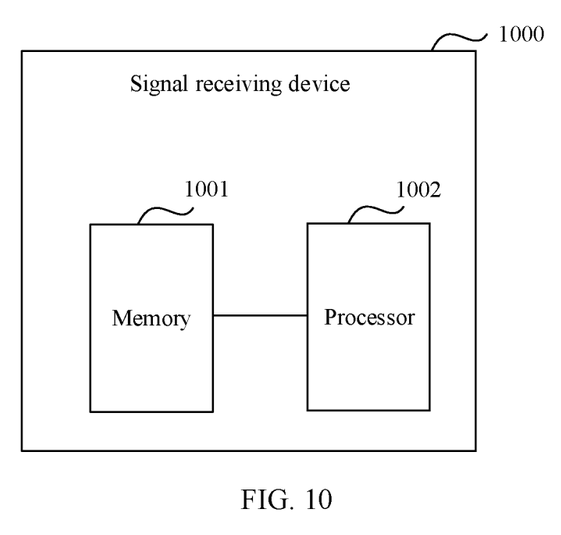
FIG. 10 is a schematic diagram of a structure of a signal receiving device according to an embodiment of this application.

Based on a same technical concept, an embodiment of this application further provides a signal receiving device. The control device 1000 may be configured to perform the signal receiving method shown in FIG. 9. For example, the signal receiving device may be a processor chip.

As shown in FIG. 10, a signal receiving device 1000 may include: a memory 1001 and a processor 1002. The memory 1001 is configured to store program code, and the processor 1002 is configured to invoke the program code stored in the memory 1001, to perform the signal receiving method shown in FIG. 9.

It should be noted that the signal receiving device 1000 may be configured to perform the signal receiving method shown in FIG. 9. For an implementation of the signal receiving device 1000 that is not described in detail, refer to the related descriptions in the signal receiving method shown in FIG. 9. Details are not described herein again.

All or some of embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid-state drive (solid state disk, SSD)), or the like.

The various illustrative logical units and circuits described in embodiments of this application may implement or operate the described functions through a general-purpose processor, a digital signal processor, an application-specific integrated circuit (ASIC), a field programmable gate array (FPGA), another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM, a flash memory, a ROM, an EPROM, an EEPROM, a register, a hard disk drive, a removable magnetic disk, a CD-ROM, or a storage medium of any other form in the art. For example, the storage medium may connect to a processor, so that the processor can read information from the storage medium and write information into the storage medium. Optionally, the storage medium may alternatively be integrated into the processor. The processor and the storage medium may be disposed in the ASIC.

These computer program instructions may alternatively be loaded onto the computer or the another programmable data processing device, so that a series of operation steps are performed on the computer or the another programmable device to generate computer-implemented processing, and instructions executed on the computer or the another programmable device provide steps for implementing a function specified in one or more procedures in the flowchart and/or one or more blocks in the block diagram.

Although this application is described with reference to specific features and embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A radar system, comprising: a window, a radar transmitter, a radar receiver, a processor, and a signal receiver, wherein the radar transmitter is configured to: transmit a radar detection signal, and transmit the radar detection signal to a front obstacle through the window;

the radar receiver is connected to the signal receiver, and is configured to: receive a reflected signal generated when the radar detection signal encounters the front obstacle, and transmit the reflected signal to the signal receiver;

the signal receiver is connected to the processor, and is configured to: when the radar transmitter transmits the radar detection signal, receive, after preset duration, the reflected signal transmitted by the radar receiver, convert the reflected signal into an electrical signal, and output the electrical signal to the processor, wherein the preset duration is a sum of first duration required for the radar detection signal to arrive at the window and second duration required for the reflected signal to arrive at the radar receiver from the window, wherein the signal receiver comprises: a control circuit and a converter, wherein the control circuit is configured to: connect to a power supply, receive electric energy output by the power supply, and when the radar transmitter transmits the radar detection signal, supply electric energy to the converter after the preset duration; and the converter is separately connected to the control circuit, the radar receiver, and the processor, and is configured to: when the control circuit supplies the electric energy, receive the reflected signal transmitted by the radar receiver, convert the reflected signal into the electrical signal, and output the electrical signal to the processor, and wherein the converter comprises a photodiode, and wherein an anode of the photodiode is connected to a first end of a first capacitor in the control circuit, and a cathode of the photodiode is connected to a signal amplifier; and the processor is configured to process the electrical signal to obtain information about the front obstacle.

2. The system according to claim 1, wherein the control circuit comprises: an inductor, a diode, a first switch, and the first capacitor;

a first end of the inductor is configured to connect to a positive electrode of the power supply, and a second end of the inductor is connected to an anode of the diode;

a cathode of the diode is separately connected to a first end of the first switch, a first end of the first capacitor, and the converter; and a second end of the first capacitor and a second end of the first switch are separately configured to connect to a negative electrode of the power supply.

3. The system according to claim 2, further comprising the signal amplifier, wherein the signal amplifier is configured to connect to the converter and the processor, and the signal amplifier is configured to: amplify power of a signal output by the converter, and output the signal to the processor.

4. The system according to claim 1, wherein the control circuit comprises: a first resistor, a second resistor, and a second switch;

a first end of the first resistor is configured to connect to a positive electrode of the power supply, and a second end of the first resistor is separately connected to a first end of the second resistor, a first end of the first capacitor, and the converter;

a second end of the second resistor is connected to a first end of the second switch; and a second end of the second switch and a second end of the first capacitor are separately configured to connect to a negative electrode of the power supply.

5. The system according to claim 4, further comprising a signal amplifier, wherein the signal amplifier is configured to connect to the converter and the processor, and the signal amplifier is configured to: amplify power of a signal output by the converter, and output the signal to the processor.

6. The system according to claim 1, wherein the control circuit comprises: a third switch, and a fourth switch;

a first end of the third switch is configured to connect to a positive electrode of the power supply, and a second end of the third switch is separately connected to a first end of the fourth switch, a first end of the third first capacitor, and the converter; and a second end of the fourth switch and a second end of the third first capacitor are separately configured to connect to a negative electrode of the power supply.

7. The system according to claim 6, further comprising a signal amplifier, wherein the signal amplifier is configured to connect to the converter and the processor, and the signal amplifier is configured to: amplify power of a signal output by the converter, and output the signal to the processor.

8. The system according to claim 1, wherein the power supply comprises a plurality of sub-power supplies with different voltages;

the control circuit comprises: a plurality of switches that are in a one-to-one correspondence with the plurality of sub-power supplies with different voltages;

a first end of each of the plurality of switches is configured to connect to a positive electrode of the corresponding sub-power supply, and a second end of each of the plurality of switches is separately connected to a first end of the first capacitor and the converter; and a second end of the first capacitor is configured to connect to a negative electrode of each of the plurality of sub-power supplies.

9. The system according to claim 1, further comprising the signal amplifier, wherein the signal amplifier is configured to connect to the converter and the processor, and the signal amplifier is configured to: amplify power of a signal output by the converter, and output the signal to the processor.

10. A signal receiving method, applied to a radar system, wherein the radar system comprises a window, a radar transmitter, a radar receiver, a processor, and a signal receiver, wherein the radar transmitter is configured to: transmit a radar detection signal, and transmit the radar detection signal to a front obstacle through the window;

the radar receiver is connected to the signal receiver, and is configured to: receive a reflected signal generated when the radar detection signal encounters the front obstacle, and transmit the reflected signal to the signal receiver;

the signal receiver is connected to the processor, and wherein the method comprises:

receiving electric energy output by a power supply; and when it is determined that the radar transmitter transmits a radar detection signal, supplying electric energy to the signal receiver after preset duration, wherein the signal receiver receives a reflected signal transmitted by the radar receiver, wherein the preset duration is a sum of first duration required for the radar detection signal to arrive at the window and second duration required for the reflected signal to arrive at the radar receiver from the window; and wherein the signal receiver comprises: a control circuit and a converter; and wherein the control circuit is configured to: connect to a power supply, receive electric energy output by the power supply, and when the radar transmitter transmits the radar detection signal, supply electric energy to the converter after the preset duration; and the converter is separately connected to the control circuit, the radar receiver, and the processor, and is configured to: when the control circuit supplies the electric energy, receive the reflected signal transmitted by the radar receiver, convert the reflected signal into an electrical signal, and output the electrical signal to the processor, and wherein the converter comprises a photodiode, and wherein an anode of the photodiode is connected to a first end of a first capacitor in the control circuit, and a cathode of the photodiode is connected to a signal amplifier.

11. The method according to claim 10, wherein the preset duration is determined by performing the following steps:
   determining a first distance between the radar transmitter and the window and a second distance between the radar receiver and the window; and
   determining the preset duration based on a transmission rate of the radar detection signal, the first distance, and the second distance.

12. The method according to claim 10, wherein the control circuit comprises: an inductor, a diode, a first switch, and the first capacitor;
   a first end of the inductor is configured to connect to a positive electrode of the power supply, and a second end of the inductor is connected to an anode of the diode;
   a cathode of the diode is separately connected to a first end of the first switch, a first end of the first capacitor, and the converter; and
   a second end of the first capacitor and a second end of the first switch are separately configured to connect to a negative electrode of the power supply.

13. The method according to claim 10, wherein the control circuit comprises: a first resistor, a second resistor, and a second switch;
   a first end of the first resistor is configured to connect to a positive electrode of the power supply, and a second end of the first resistor is separately connected to a first end of the second resistor, a first end of the first capacitor, and the converter;
   a second end of the second resistor is connected to a first end of the second switch; and
   a second end of the second switch and a second end of the first capacitor are separately configured to connect to a negative electrode of the power supply.

14. The method according to claim 10, wherein the control circuit comprises: a third switch, and a fourth switch;
   a first end of the third switch is configured to connect to a positive electrode of the power supply, and a second end of the third switch is separately connected to a first end of the fourth switch, a first end of the first capacitor, and the converter; and
   a second end of the fourth switch and a second end of the first capacitor are separately configured to connect to a negative electrode of the power supply.

15. The method according to claim 10, wherein the power supply comprises a plurality of sub-power supplies with different voltages;
   the control circuit comprises: a plurality of switches that are in a one-to-one correspondence with the plurality of sub-power supplies with different voltages;
   a first end of each of the plurality of switches is configured to connect to a positive electrode of the corresponding sub-power supply, and a second end of each of the plurality of switches is separately connected to a first end of the first capacitor and the converter; and
   a second end of the first capacitor is configured to connect to a negative electrode of each of the plurality of sub-power supplies.

16. The method according to claim 10, wherein the radar system further comprises the signal amplifier, wherein the signal amplifier is configured to connect to the converter and the processor, and the signal amplifier is configured to: amplify power of a signal output by the converter, and output the signal to the processor.

17. An autonomous driving system, comprising a radar system, and a power supply, wherein the power supply is configured to supply electric energy to the radar system, and the radar system comprises a window, a radar transmitter, a radar receiver, a processor, and a signal receiver, wherein
   the radar transmitter is configured to: transmit a radar detection signal, and transmit the radar detection signal to a front obstacle through the window;
   the radar receiver is connected to the signal receiver, and is configured to: receive a reflected signal generated when the radar detection signal encounters the front obstacle, and transmit the reflected signal to the signal receiver;
   the signal receiver is connected to the processor, and is configured to: when the radar transmitter transmits the radar detection signal, receive, after preset duration, the reflected signal transmitted by the radar receiver, convert the reflected signal into an electrical signal, and output the electrical signal to the processor, wherein the preset duration is a sum of first duration required for the radar detection signal to arrive at the window and second duration required for the reflected signal to arrive at the radar receiver from the window, wherein the signal receiver comprises: a control circuit and a converter, wherein
      the control circuit is configured to: connect to a power supply, receive electric energy output by the power supply, and when the radar transmitter transmits the radar detection signal, supply electric energy to the converter after the preset duration; and
      the converter is separately connected to the control circuit, the radar receiver, and the processor, and is configured to: when the control circuit supplies the electric energy, receive the reflected signal transmitted by the radar receiver, convert the reflected signal into the electrical signal, and output the electrical signal to the processor, and wherein the converter comprises a photodiode, and wherein an anode of the photodiode is connected to a first end of a first capacitor in the control circuit, and a cathode of the photodiode is connected to a signal amplifier; and
   the processor is configured to process the electrical signal to obtain information about the front obstacle.

18. The autonomous driving system according to claim 17, wherein the control circuit comprises: an inductor, a diode, a first switch, and the first capacitor;
   a first end of the inductor is configured to connect to a positive electrode of the power supply, and a second end of the inductor is connected to an anode of the diode;
   a cathode of the diode is separately connected to a first end of the first switch, a first end of the first capacitor, and the converter; and
   a second end of the first capacitor and a second end of the first switch are separately configured to connect to a negative electrode of the power supply.

19. The autonomous driving system according to claim 17, wherein the radar system further comprises the signal amplifier, wherein
   the signal amplifier is configured to connect to the converter and the processor, and the signal amplifier is configured to: amplify power of a signal output by the converter, and output the signal to the processor.

20. The autonomous driving system according to claim 18, wherein the radar system further comprises the signal amplifier, wherein the signal amplifier is configured to connect to the converter and the processor, and the signal amplifier is configured to: amplify power of a signal output by the converter, and output the signal to the processor.

\* \* \* \* \*